United States Patent
Synstad et al.

[15] 3,696,495
[45] Oct. 10, 1972

[54] THREADED RING TURNING DEVICE

[72] Inventors: Alvin R. Synstad, Clifton, Va.; Luther M. Burges, Frederick; Paul P. Day, Potomac, both of Md.

[73] Assignee: The United States of America as represented by the Secretary of the Navy

[22] Filed: April 5, 1971

[21] Appl. No.: 131,233

[52] U.S. Cl. ................................................29/240
[51] Int. Cl. .............................................B23p 19/04
[58] Field of Search ....29/240, 456; 81/57.21, 57.14, 81/57.3, 57.2; 73/133, 139

[56] References Cited

UNITED STATES PATENTS

| 2,639,894 | 5/1953 | Smith | 81/57.2 |
| 3,507,174 | 4/1970 | Dickmann | 81/57.21 X |
| 3,662,842 | 5/1972 | Bromell | 29/240 X |

*Primary Examiner*—Robert C. Riordon
*Assistant Examiner*—J. C. Peters
*Attorney*—R. S. Sciascia, Q. E. Hodges and J. W. Peterson

[57] ABSTRACT

The invention is a device to support the weight of a threaded ring as it is rotated so that the threads on the threaded ring and corresponding threads on the tank receiving the threaded ring are not rubbing but are balanced in the tolerance of the threaded fit.

8 Claims, 3 Drawing Figures

PATENTED OCT 10 1972 3,696,495

INVENTORS
ALVIN R. SYNSTAD
LUTHER M. BURGEE
PAUL P. DAY

BY

*Hodges* ATTORNEY

THREADED RING TURNING DEVICE

The invention described herein may be manufactured and used by or for the Government of the United States of America for Governmental purposes without the payment of any royalties thereon or therefor.

BACKGROUND OF THE INVENTION

The invention provides a means to support and rotate a threaded ring which is utilized to seal high pressure test tanks. Such a threaded ring weighs approximately 13,900 pounds. In the past the method of supporting and rotating such a threaded ring was to support the weight of the threaded ring on an overhead crane with an intermediate dynamometer and chain hoist operated by two men while four additional men walked the threaded ring in by means of a turn stile. Unfortunately, this method has caused tremendous galling of the threads which resulted in hours of hand work to restore. In addition, time was lost by the increased difficulty which developed in the installation, removal of the threaded ring when galling did occur.

The present invention has the advantages that it requires one or two men, 20 minutes to operate (versus the previous method which required six men, 2 hours to operate), that it eliminates galling of the threaded ring and that it eliminated safety hazards.

SUMMARY OF THE INVENTION

The general purpose of the invention is to support the weight of a threaded ring as it is rotated so that the threads on the threaded ring and corresponding threads on the tank are not rubbing but rather are balanced in the tolerance of the threaded fit.

OBJECTS OF THE INVENTION

The principal object of the invention is to provide a device which can support the weight of a threaded ring and rotate said ring without causing damage to either the ring or the tank into which the ring is being threaded.

It is a further object of the instant invention to provide a device which will reduce the number of man hours required to install and remove the threaded ring.

Still another object of the invention is to provide a device which will eliminate safety hazards encountered by prior methods of threaded ring removal and insertion.

DESCRIPTION OF THE PREFERRED EMBODIMENT

Figure 1:
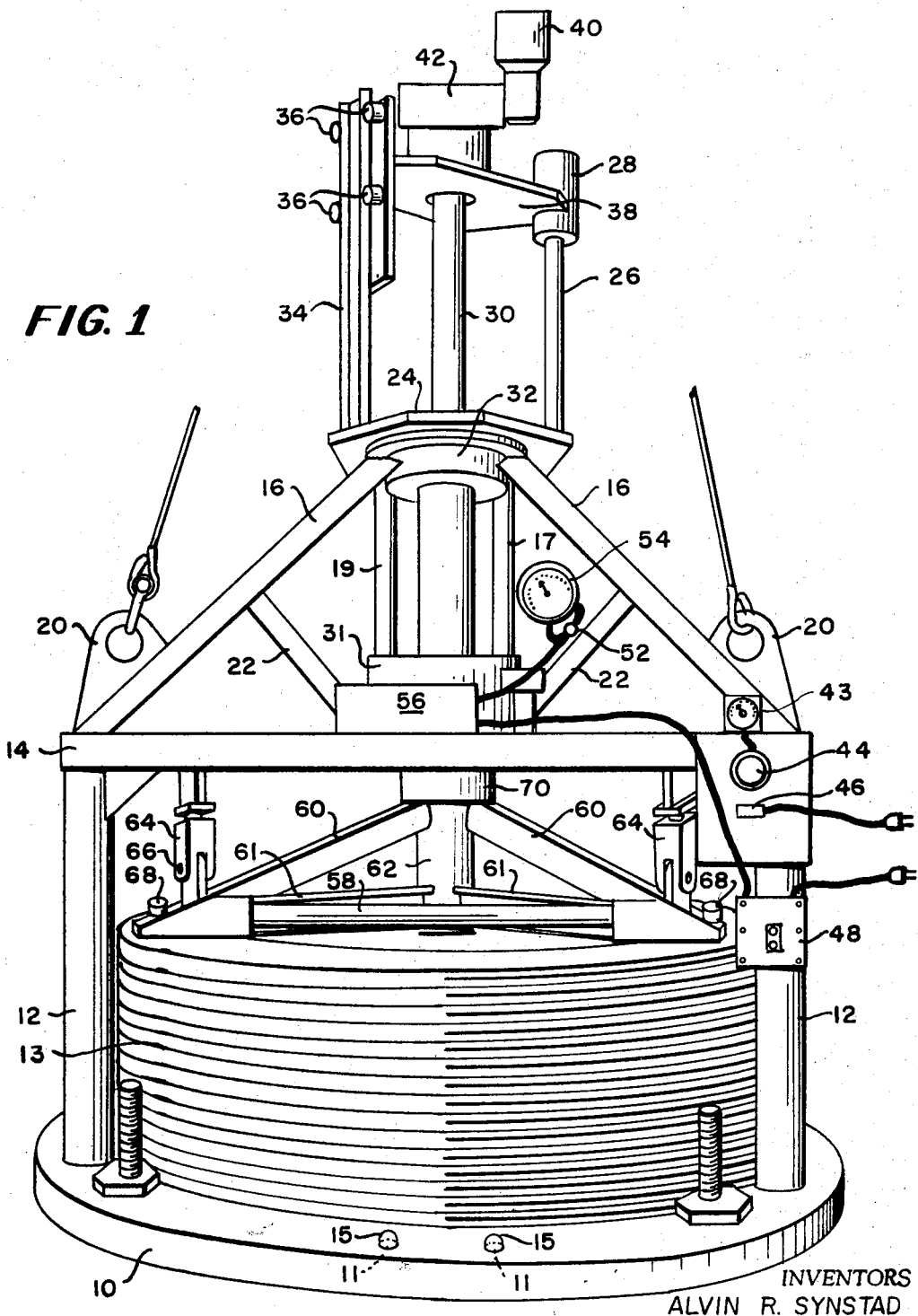
FIG. 1 is a perspective view of the threaded ring turning device in operation.
Figure 2:
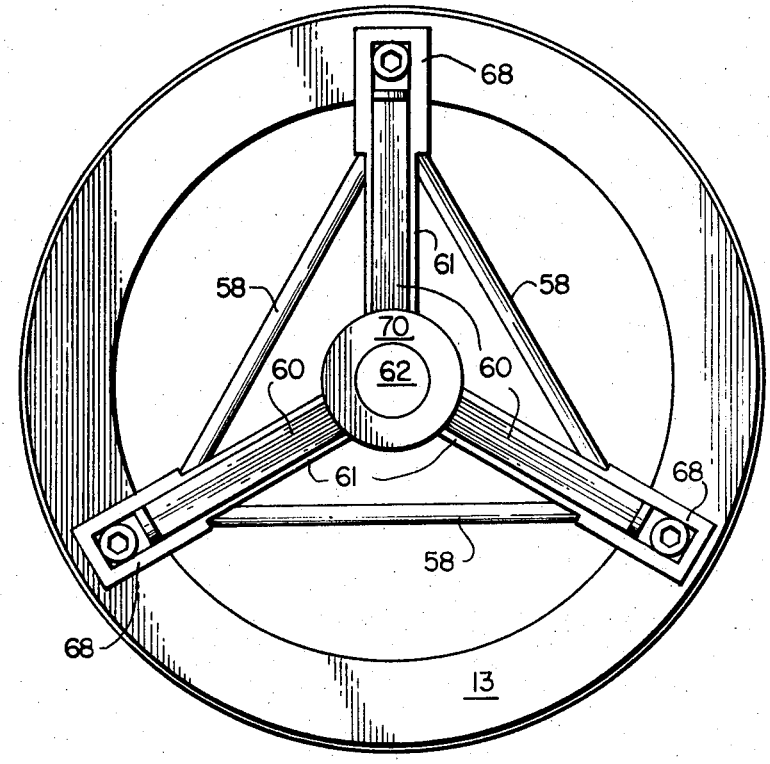
FIG. 2 is a top view of the threaded turning device.
Figure 3:
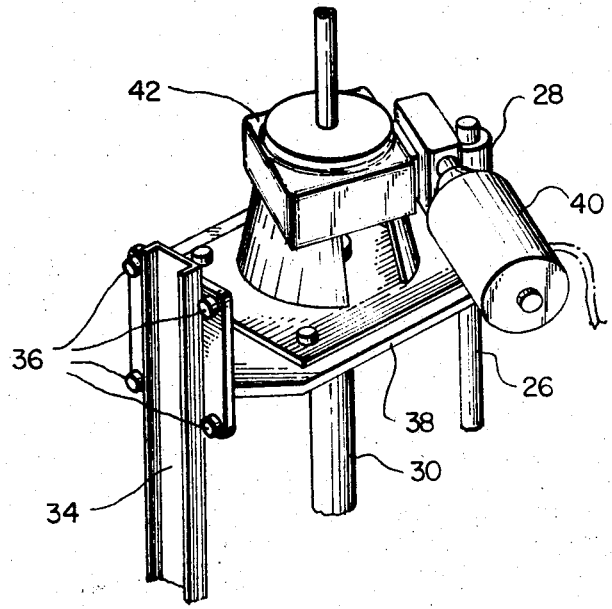
FIG. 3 is a perspective view of the rotating subsection of the threaded ring turning device.

With continued reference to the drawing, FIG. 1 shows a perspective view of the threaded ring turning device installed in position on top of a high pressure tank. The entire assembly is lifted into position on top of the tank by an overhead crane which is attached to eyelets 20. The proper positioning of the device is governed by alignment pins 15 welded to the tank which mates with holes 11 in the bottom ring 10 of the device. The device has three sub-assemblies: a support subassembly; a lifting sub-assembly; and a rotating subassembly. The support sub-assembly comprises a bottom ring 10, having three vertical supports 12, welded thereto. Three cross beams 14 are connected to said vertical supports 12. Three inclined supports 16 are attached to the horizontal beams 14, to converge toward the center of the structure to provide support for the plate 24. Eyelets 20, which are used to transport the entire device are attached to the inclined supports 16. The lifting sub-assembly comprises a cylinder 31 attached to plate 24 at 32. Cylinder 31 has piston shaft 30 extending completely through said cylinder, said piston shaft 30 can rotate with respect to cylinder 31. The lower end of said piston shaft 30, is attached to downwardly inclined supports 60, at 70. Supports 60 are connected to three horizontal members 58. The three horizontal members 58 form a triangular configuration reinforced by center post 62 and members 61. This triangular shaped configuration attaches to the threaded ring 13 by means of cap screws 68. In order to relieve loading on the cylinder 31, when the device is being transported, the support subassembly has supports 64, attached to horizontal members 14 which connect to the three horizontal members 58 via safety pins 66. When the threaded ring is being inserted or taken out of the test tank, the safety pins 66 are removed. The cylinder 31 of the lifting sub-assembly is controlled by hydraulic pressure from hydraulic pump 56. Pump 56 is connected to an electrical power source via switch 48 and power leads. The hydraulic pressure to the cylinder is regulated by needle valve 52 and hydraulic pressure gauge 54. The rotary sub-assembly can be better viewed in FIG. 3. The sub-assembly comprises motor means 40 connected via a right angle gear reduction means 42 to the piston shaft 30. The speed of rotation of said shaft is controlled by the use of ammeter 43, variable voltage control knob 44 and directional switch 46. Through use of the ammeter 43, the operator can carefully regulate the amount of torque being applied by the motor 40 to the threaded ring. The ammeter 43 will sense a pre-galling condition which can be compensated for by use of the needle valve 52 of the lifting sub-assembly. Shaft 26 and guide channel 34 are attached to plate 24. Upper platform 38 has roller bearings 36 and shaft bearing 28 mounted thereon to engage with the guide channel 34 and shaft 26, respectively. Shaft 26 and guide channel 34 prevent the upper platform 38 on which the motor 40 and gear reduction means 42 are mounted from rotating while allowing the platform 38 to move up and down.

In operation electric power is supplied to the gear reducer motor 40 and the hydraulic pump 56. Gauge 54 is adjusted by needle valve 52 to the proper hydraulic pressure depending on whether the thread is being removed or inserted, i.e., greater than the pressure required to balance the weight of the threaded ring. when removing the ring and less than the balancing pressure when inserting the ring. Constant pressure is supplied to the hydraulic cylinder 31, to raise or lower the threaded ring as the ring is turned relative to the tank 11. This pressure may have to be raised or lowered slightly to remove the three safety lock pins 66. After these pins are removed the threaded ring is lowered so that the thread on the threaded ring and the tank match. Now the threaded ring is ready to be rotated. The directional switch 46 is turned to the designation in or out, depending on whether the threaded ring is to be installed or removed, making sure the psi recorded on the gauge 54 corresponds to the direction of rotation selected. The variable voltage control knob 44 is turned to start rotation of the threaded ring. The ammeter 43 is watched and the current draw is kept at an operational setting. To keep this range, the needle valve 52 may have to be adjusted from time to time during the operation. The adjustment is made to keep an air gap existing between the threaded ring and the tank threads. A reading on the ammeter above the operational valve will indicate that threads on the threaded ring and corresponding threads in the tank are binding. It is noted that the present manual control system could be replaced by any of a number of well known automated systems such as a computer or tape control system.

It is understood that the invention is not limited to the exact details of construction shown and described, for obvious modifications will occur to persons skilled in the art. It is therefore to be understood that within the scope of the appended claims the invention may be practiced otherwise than as specifically described.

What is claimed is:

1. In a high pressure tank a threaded ring turning device to support the weight of a threaded locking ring and to rotate it comprising:
    support means removeably attached to the tank in which the threaded ring is being inserted or removed;
    clamp means removably attached to the threaded ring;
    lifting means connecting said clamp means to said support means to move said threaded ring toward and away from said tank;
    rotation means connected to said lifting means and said support means to rotate said clamp means and said threaded ring;
    sensing means connected to said rotating means to sense the load on the rotating means; and
    adjustment means connected to said lifting means for adjustment to minimize the load on the rotating means.

2. A device as described in claim 1 wherein said lifting means comprises a cylinder with a piston having a piston shaft extending through both ends of the cylinder, said piston and shaft being capable of rotation with respect to said cylinder.

3. A device as described in claim 2 wherein said rotation means includes a motor means connected to one end of said piston shaft to rotate said shaft.

4. A device as described in claim 3 wherein the other end of said piston shaft is connected to said clamp means so that the motor means can rotate said clamp means and threaded ring.

5. A device as in claim 4 wherein said rotation means further includes a platform supporting said motor means, said platform having bearing means mounted thereon.

6. A device as in claim 5 wherein said support means further includes a brace means which contacts said bearing means to prevent said platform from rotating with respect to said support means and to allow said platform to move toward and away from said support means.

7. A device as in claim 2 wherein said adjustment means comprises a needle valve and gauge to adjust the pressure in said cylinder.

8. A device as in claim 3 wherein said sensing means comprises an ammeter serially connected to said means to sense the electrical current drawn by said motor means proportional to the load on said motor means.

* * * * *